United States Patent [19]

Schaefer et al.

[11] Patent Number: 4,833,178
[45] Date of Patent: May 23, 1989

[54] COMPOSITION AND METHOD FOR SETTING AND GROUTING CERAMIC TILE

[75] Inventors: Robert E. Schaefer, Hillsdale; Scott C. Broney, Robbinsville, both of N.J.; Joseph J. Chesney, Jr., Salem, Ohio

[73] Assignee: Tile Council of America, Inc., Princeton, N.J.

[21] Appl. No.: 199,516

[22] Filed: May 27, 1988

Related U.S. Application Data

[63] Continuation of Ser. No. 503,860, Jun. 13, 1983, abandoned.

[51] Int. Cl.$^4$ .......................... C08K 3/34; C08K 3/30; C08K 3/20; C08K 3/26
[52] U.S. Cl. .................................. 523/428; 523/457; 523/466
[58] Field of Search .............. 523/428, 429, 466, 468, 523/457

[56] References Cited

U.S. PATENT DOCUMENTS

| | | | |
|---|---|---|---|
| 3,396,118 | 8/1968 | Weller | 523/466 |
| 3,396,140 | 8/1968 | Weller | 523/466 |
| 3,635,875 | 1/1972 | Reither et al. | 523/428 |

OTHER PUBLICATIONS

Lee et al.; Handbook of Epoxy Resins; McGraw Hill Book Co.; 1967; pp. 4–58.

*Primary Examiner*—Lewis T. Jacobs
*Attorney, Agent, or Firm*—Morgan & Finnegan

[57] ABSTRACT

The invention relates to a composition and method for setting and grouting tile on various substrates characterized by quick setting times and excellent chemical and physical properties.

9 Claims, No Drawings

COMPOSITION AND METHOD FOR SETTING AND GROUTING CERAMIC TILE

This is a continuation of application Ser. No. 503,860 filed June 13, 1983, now abandoned.

BACKGROUND OF THE INVENTION

There are many required instances when ceramic tile must be set and grouted in as short a time as possible, e.g., in industrial or commercial applications where long shut-downs are costly and disruptive.

At present, the conventional state of the art for such application employs quick setting cementitious materials. These compounds, usually portland cement based, contain some type of cement setting accelerator such as calcium chloride or other salt compounds. However, addition of these accelerating compounds usually detracts from the ultimate physical and chemical resistance properties of the cementitious compounds otherwise obtainable.

Furthermore, in industrial and/or commercial areas even where severe conditions exist and maximum properties of the material are required, there is limited time available for installation, and in the past this has eliminated the possibility of using polymeric systems to satisfy severe abuse conditions. For economic reasons the down time must be as short as possible.

Prior to the present invention it was common practice to use these modified cementitious compounds with the understanding that there was a trade off, of peak performance or maximum properties of quality, for the more economical and practical time frame of application.

Therefore, it was felt that if one could develop a polymeric compound to meet the application demands of both speed of cure and severe environmental conditions with resinous materials currently available, namely an epoxy system which has general acceptance in providing the physical and chemical properties needed for these severe applications, coupled with the application speed of the cementitious types it would satisfy a need long sought in the industry for both new installation and installations over existing flooring materials and substrates.

Thus, the present method for setting and grouting ceramic tile within a time frame heretofore associated only with quick setting cementitious based materials, but, with far superior physical and chemical properties to the quick sets mentioned and with properties that clearly approach those of polymeric systems taking 5-10 times longer to cure and to open up to traffic meets that objective.

SUMMARY OF THE INVENTION

Thus, it is an object of this invention to provide a method wherein those desirable high quality properties of epoxy resin-hardener compounds are maintained while adding to that the speed and convenience of cementitious materials.

It is a further object of this invention to provide a system which will adhere to various preexisting common substrates such as but not limited to the following: wood (hard and soft), plywood (interior-exterior), particle board, concrete, brick, slate, marble, vinyl tile, vinyl-asbestos tile, asphalt tile, ceramic tiles (glazed and unglazed), linoleum, epoxy and other polymeric coatings.

Hence, it is a further object of this invention to provide a method which can be used on an existing floor or wall.

Another object of this invention is to provide a material which will allow easy cleanup of tools and surrounding areas of the uncured material using water (or soapy water) and a sponge or towel before initial curing of the material.

An object of this invention is to provide an installation method for the quick setting and grouting of ceramic floor and wall tiles and brick.

It is a further object of this invention to provide a method which employs the aforedescribed composition which permits curing in the presence of moisture and/or water.

Another object of this invention is to provide a method which results in adhesion to substrates and exhibits the chemical resistance to prevent undermining of the substrates from the physical and chemical environment.

Another object of this invention is to provide a method which provides a composition which has sufficient working time or pot life acceptable to and in keeping with normal ceramic tile installation practices and procedures.

DETAILED DESCRIPTION OF THE INVENTION

According to the present invention, there is provided a composition and method for setting and grouting ceramic tile to a wall or floor substrate which is unique in the sense that it is characterized by advantages heretofore not possible or known in the prior art. More particularly, the herein disclosed and claimed composition has a quick setting time comparable to quick setting cementitious based materials and physical and chemical properties comparable to polymeric systems. Thus, it is used in method for setting and grouting ceramic tile using a two-component epoxy resin-hardener compound which, on application, is quick-curing and significantly reduces dwell time between tile setting and grouting, while exhibiting ample working time so essential to current application techniques and procedures.

The epoxy resin adhesive compound employed in the composition and method of the present invention consists of epoxy resin polymers optionally modified with thixotropic and surface active agents and cured with modified polyamine filled hardeners which have been further modified or compounded with non-reactive diluents or plasticizers, colorants, fillers or extenders (for structural strength), adhesion promoting agents and surface active agents.

The epoxy resin component used herein comprises an epoxy resinous material containing at least two epoxy groups and being substantially free of units derived from vegetable oils and aliphatic ethers.

A variety of polyepoxide resins were examined and found to be marginal at best. These were the epoxidized oils such as castor oil, cashew nut oil, etc. and aliphatic ether epoxy resins such as, Union Carbide's ERL series. Although they formed a product their rate of reactivity was much too slow.

The preferred polyepoxides are those formed by reacting epichlorohydrin with bisphenol-A to form the diglycidal ether of bisphenol-A. These typically have a molecular weight ranging from about 320 to 10,000. Ideally, the polyepoxides having a molecular weight range from about 330 to 560 and containing at least two oxirane groups, that is, two epoxy groups

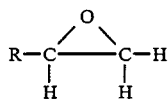

This difunctional, trifunctional or polyfunctional resin may be saturated, unsaturated, cycloaliphatic, alicyclic or heterocyclic and may be substituted with substituents such as but not limited to halide atoms, hydroxyl groups, ether radicals, and the like.

The preferred difunctional epoxy resins suitable for the present invention are marketed under the following trade names but are not limited to the following: Shell Epon 825, 826, 828, 8280, 830, 834, RCI 37-140, 37-139.

Ciba-Geigy Araldite 6004, 6005, 6010 and 6020. Celanese Epi-Rez 508, 509, 510, WO-510, 5101. Dow D.e.r. 330, 331, 332, 317, 337 and any other epoxy resin that meets the general specifications and or standards of the above listed resins, i.e., EEW (epoxy equivalent weight) of (160–290) molecular weight of (360–440) and a viscosity of 3,000 to 25,000 CPS at 25° C.

Reactive diluents suitable for use in the present invention can be functional or non-functional. Those classified as functional generally comprise mono-, di- or triepoxides often referred to as monomers but can in fact be difunctional or trifunctional and either aliphatic or aromatic polyethers and combinations thereof.

Examples of reactive diluents of the functional type are, but not limited to, the following: monofunctional epoxies usually referred to as monoepoxides and low viscosity resins usually referred to as difunctional reactive diluents. They can be either aliphatic, aromatic or combinations of both.

Monoepoxides suitable for the present invention are butyl glycidal ether, cresyl glycidal ether, phenol glycidal ether, allyl glycidal ether and other aliphatic and aromatic monoglycidal ethers. Other monoepoxides are epoxide 7, and epoxide 8.

Difunctional epoxides are: diepoxide flexibilizers, 1,4 butanediol diglycidal ether, aliphatic triglycidal ethers, and aliphatic polyglycidal ethers, butadiene dioxide, dimethylpentane dioxide, diglycidal ether, diethylene glycol diglycidal ether, divinylbenzene dioxide, and diglycidal ether of resorcinol. A trifunctional example would be 2,6 diglycidal phenyl glycidal ether.

Reactive but nonfunctional examples are triphenyl phosphite marketed under the trade name Modepox, and α-hydroxy toluene.

Non-reactive diluents, sometimes referred to as plasticizers may also be used.

Examples of non-reactive diluents are, but not limited to, the following: polymethoxy acetals, dioctyl phthalate, dibutyl phthalate, pine oil, high boiling alcohols such as Benzyl Alcohol, coal tars, glycol ether-esters, Styrene diluents such as low molecular weight polystyrene resins and phenolic diluents, such as nonyl and dinonyl phenol.

The hardener system suitable for the present invention is a combination of modified polyamines, or modified polyamidoamines, preferably a combination of modified polyamines. More particularly, it is preferred to use a combination of modified polyamines which comprises the reaction product of an aliphatic polyamine and a compound selected from the group consisting of aliphatic and aromatic mono- and diepoxides, mono- and dihydric phenols, aldehydes, nitriles or mixtures thereof, and a polyamine of the cycloaliphatic type.

The most suitable is a combination of a modified aliphatic polyamine and a modified cycloaliphatic polyamine. Examples of those currently commercially available are Reichhold Chemicals Inc. (RCI) Epotuf 37-614, 37-605, 37-611, 37-607 and 37-630.

Specifically combinations of RCI's Epotuf 37-614 and Epotuf 37-607 are particularly illustrative of a suitable curative hardener.

Polymercaptan epoxy curatives marketed by Diamond Shamrock Co. were tested and could be used but were ruled out due to cost, odor (sulfur smell) and short working life.

Inert fillers or extenders are incorporated for many reasons. The fillers chosen were picked because they offered the most practical and economic approach to obtaining maximum structural (compressive, flexural and tensile) strength and workability (trowelable consistency).

Fillers suitable for this present invention are talc's (magnesium oxide), whiting's (calcium carbonates), silicas (silicon dioxide), aluminia's, diatomaceous earth, pyrophyllite, and blanc fixe. A preferred filler is silica having a particle size of predominately 100 mesh.

Colorants may be added in small quantities to the composition if desired. The colorants can be either organic or inorganic. However, caution should be used in choosing a colorant which does not interfere with the rate of cure or adhesion and should be resistant to chemical attach and changes in color due to weathering effects.

Examples of suitable colorants are, but no limited to, titanium dioxide and carbon blacks, bone blacks and channel blacks.

Adhesion promoters may also be added if desired. Examples of these are terpene resins (tackifies), styrene resins (green strength) and silanes (epoxy, amine and mercaptan terminated). These are coupling agents used with silaceous materials.

Deaerating compounds may be added. They are referred to as surface active agents and in this case act to degas or deair the material of air entrapped during manufacture and minimizes air bubbles mixed in on the job-site too. Examples of these are but not limited to, Monsanto's 1244, 1344, modaflow, Dow Corning AF-60, AF-70, AF-80, AF-90 and 3 M's FC-410, FC-420, FC-430, FC-440.

Thixotropic agents are often added to control rheology (the consistency or non-sagging qualities especially on vertical surfaces). Examples are bentones, aerogels, Thixin R, Thixotrol ST and Cab-O-sils.

To produce the adhesive composition of this invention it is necessary to mix together the polyepoxide portion with the corresponding coreactant hardener component. The amount of hardener coreactant mixed with the polyepoxide can vary. Generally it can vary 15 to 85 percent by weight of the polyepoxide resin portion. Preferably the percentage range by weight should not vary more than 19.5 to 32.0.

Specifically the polyepoxide resin-coreactant hardener adhesive composition's mixed ratio most beneficial for this invention is one in which the polyepoxide resin and coreactant hardener portions are stoichiometrically balanced.

This polymeric portion of this invention will be more readily understood by reference to the accompanying specific examples which are intended as illustrative rather than all encompassing and limiting the invention except as defined in the accompanying claims.

EXAMPLE I

A polyfunctional epoxide resin with a minimum functionality of 2.5, and epoxide equivalent weight range of 165 to 200, and a viscosity of 4,000 to 11,000 cps at 25° C., such as Diamond Shamrock Corporation's Capcure Epoxide WR was used to prepare the following "A" part compound:

|  | P.B.W. |
| --- | --- |
| Polyfunctional epoxide resin (DSC Capcure Epoxide WR) | 100.00 |
| alpha hydroxy toluene | 6.00 |
| silica (mostly 100 mesh) | 190.00 |
| PC-1344 (Monsanto) | .15 |

A coreactant hardener compound was prepared using a difunctional polymercaptan hardener with a viscosity of about 210 to 290 and a mercaptan milliequivalence per gram value of about 4.99 to 5.99, such as (DSC Capcure WR-35).

|  | P.B W. |
| --- | --- |
| Difunctional polymercaptan (DSC Capcure WR-35) | 85.00 |
| alpha hydroxy toluene | 4.00 |
| silica (mostly 100 mesh) | 290.00 |
| PC-1344 (Monsanto) | .15 |
| silane A-187 (Union Carbide) | 1.50 |

The "A" and "B" described above were mixed together in a ratio by weight A/B of 296.15 to 380.8 at room temperature, troweled and allowed to cure into a cross-linked copolymer matrix between 4"×4" ceramic quarry tiles.

The resultant cross-linked copolymer adhesive composition was evaluated and found to have an impractical short pot or working life, troweled poorly, had an objectionable odor and was only fair in its washability. As formulated, material was unacceptable, therefore, shear bonds were not completed.

EXAMPLE II

A difunctional epoxide resin of the epichlorohydrin-bisphenol of acetone type with an epoxide equivalent weight ranging from 175-200, a melting point range of 8°-10° C. and a viscosity ranging from 5,000 to 12,000 cps at 25° C. was used in this example. Typically the resin is marketed under the trade names mentioned earlier. As purchased from Reichhold Chemical's Inc., Epotuf 37-140.

The resin was used to prepare the following "A" part:

|  | P.B.W. |
| --- | --- |
| Difunctional Epoxide resin (Epotuf 37-140) | 100.00 |
| alpha hydroxy toluene | 4.00 |
| silica (mostly 100 mesh) | 170.00 |
| PC-1344 (Monsanto) | 0.15 |

A modified aliphatic polyamine with an approximate equivalent weight per active hydrogen of 50, and a viscosity of about 3,400-4,600 cps at 25° C. was used to prepare the folllowing "B" part:

|  | P.B.W. |
| --- | --- |
| Modified polyamine (RCI Epotuf 37-614) | 26.00 |
| alpha hydroxy toluene | 6.00 |
| silica (mostly 100 mesh) | 75.00 |
| PC-1344 (Monsanto) | 0.30 |
| silane A-187 (Union Carbide) | 1.50 |

The "A" and "B" were mixed together in a ratio by weight A/B of 274.15/108.3 at room temperature, troweled and allowed to react and cure into a cross-linked copolymer matrix between two ceramic quarry tiles.

The resulting cross-linked copolymer adhesive composition was tested for shear bond strength at two and four hours and produced 180 PSI and 1000 PSI respectively.

The four hour shear bond test results were all tile breakage with no bond line failures.

Trowelability was rated as very smooth, workability 30 minutes and washability (that is, remove excess with water and a sponge) was rated good and could be removed more than 45 minutes later.

EXAMPLE III

The same resin "A" part composition described in Example II was used to evaluate a composition of two modified aliphatic polyamines (RCI-Epotuf 37-630 and RCI Epotuf 37-611). The following "B" part was prepared:

|  | P.B.W. |
| --- | --- |
| Modified polyamine (RCI, Epotuf 37-611) | 70.00 |
| Modified polyamine (RCI, Epotuf 37-630) | 10.50 |
| alpha hydroxy toluene | 6.00 |
| silica (mostly 100 mesh) | 300.00 |
| PC 1344 (Monsanto) | 0.30 |
| silane A-187 (Union Carbide) | 1.50 |

The "A" (from Example II) and "B" above were mixed together in a ratio by weight A/B of 274.15 to 388.3 at room temperature, troweled and allowed to react and cure into a crossed-linked copolymer matrix between two ceramic quarry tiles.

Trowelability was rated poor, workability was short 15-20 minutes, washability was good at greater than 1 hour. Due to the poor troweling and short pot like shear bond testing was not initiated.

EXAMPLE IV

The resin described in Example I was used to prepare the following "A" part:

|  | P.B.W. |
| --- | --- |
| Polyfunctional epoxide resin (Diamond Shamrock Capcure W-R) | 100.00 |
| alpha hydroxy toluene | 6.00 |
| silica (mostly 100 mesh) | 170.00 |
| PC-1344 (Monsanto) | 0.15 |

A coreactant hardener combining a difunctional polymercaptan hardener used in Example I, "B" part, and a modified polyamine was prepared to be compared with the results of Example I and Example III which only used a polymercaptan and modified polyamine respectively. The difunctional polymercaptan hardener (Capcure WR-35) is described in Example I).

The compound was prepared as follows:

|  | P.B.W. |
|---|---|
| Difunctional polymercaptan (Diamond Shamrock Capcure WR-35) | 42.5 |
| alpha hydroxy toluene | 4.0 |
| Modified polyamine (RCI Epotuf 37-630) | 16.0 |
| silica (mostly 100 mesh) | 270.0 |
| PC-1344 (Monsanto) | 0.3 |
| silane A-187 (Union Carbide) | 1.5 |

The "A" and "B" parts described above were mixed in the weight ratio, A/B, of 274.15 to 388.3, troweled and allowed to cure at room temperature between 4"×4" ceramic quarry tiles.

Evaluation of the material showed poor troweling, insufficient working time and inadequate washability. It was not considered any better than Examples I and III.

EXAMPLE V

A difunctional epoxide resin described in Example II was used to prepare the following "A" part.

|  | P.B W. |
|---|---|
| Difunctional epoxide resin (RCI Epotuf 37-140) | 100.0 |
| alpha hydroxy toluene | 4.0 |
| silica (mostly 100 mesh) | 170.00 |
| PC-1344 (Monsanto) | 0.15 |

A coreactant hardener composition was prepared combining a modified polyamine described in Example II and a low viscosity modified polyamido-amine such as Reichhold Chemicals Inc. Epotuf 37-620. The polyamido-amine was used in an attempt to increase the working pot life of the modified polyamine of Example II.

|  | P.B.W. |
|---|---|
| Modified polyamine (RCI Epotuf 37-614) | 21.00 |
| Modified Polyamido-Amine (RCI Epotuf 37-620) | 10.00 |
| alpha hydroxy toluene | 6.00 |
| silica (mostly 100 mesh) | 100.00 |
| PC-1344 (Monsanto) | 0.15 |
| silane A-187 (Union Carbide) | 1.50 |

The "A" and "B" described above were mixed together in a weight ratio of (A/B) 274.15 to 138.8 troweled and allowed to cure at room temperature between 4"×4" ceramic quarry tiles into a cross-linked copolymer matrix.

The material troweled well, had good workability, 40–45 minutes, good cleanability but only developed 307 PSI of shear bond after 4 hours of room temperature cure.

EXAMPLE VI

The same "A" part resin composition of Example V was used to evaluate a "B" part composition made of another modified polyamine and modified polyamido-amine combination.

The "B" part coreactant hardener was prepared using the same hardener as in Example III but with less silica filler in hopes of a more workable product.

|  | P.B.W. |
|---|---|
| Modified Polyamine (RCI Epotuf 37-611) | 70.00 |
| Modified Polyamido-Amine (RCI Epotuf 37-630) | 10.50 |
| alpha hydroxy toluene | 6.00 |
| silica (mostly 100 mesh) | 250.00 |
| silane A-187 (Union Carbide) | 1.50 |
| PC-1344 (Monsanto) | 0.30 |

The "A" and "B" described above were mixed at a weight ratio A/B of 274.15 to 337.8, troweled and allowed to cure at room temperature between 4"×4" ceramic quarry tiles into a cross-linked copolymer matrix.

The resulting copolymer composition cured too quickly (20 minute pot life and working life) to be evaluated any further.

EXAMPLE VII

The difunctional polyepoxide resin described in Example II was used to prepare the following "A" part composition.

|  | P.B.W. |
|---|---|
| Difunctional epoxide resin (RCI Epotuf 37-140) | 96.0 |
| alpha hydroxy toluene | 3.9 |
| PC-1344 (Monsanto) deaerating compound | 0.1 |

A coreactant hardener composition was prepared using the modified polyamine hardener described in Example II and a modified cycloaliphatic polyamine with a viscosity of about 210 to 500 and having an equivalent weight per active hydrogen of about 80–90. An example of such a modified cycloaliphatic polyamine is Reichhold Chemicals Inc. Epotuf 37-607.

The following is that composition:

|  | P.B.W. |
|---|---|
| Modified polyamine (RCI Epotuf 37-614) | 6.7 |
| Modified cycloaliphatic polyamine (RCI Epotuf 37-607) | 2.9 |
| alpha hydroxy toluene | 2.0 |
| silica (mostly 100 mesh) | 87.81 |
| silane A-187 (Union Carbide) adhesion promoter | 0.50 |
| PC-1344 (Monsanto) | 0.05 |
| Carbon black | 0.04 |

The "A" and "B" described above were mixed together in a weight ratio A/B of 1 to 3, troweled and allowed to cure at room temperature between 4"×4" ceramic quarry tile into a cross-linked copolymer matrix.

The resulting cross-linked copolymer was evaluated and found to have the following qualities. Good trowelability, workability, and washability. Shear bond adhesive strength at 2 hours was 0 PSI, at 3 hours 170 PSI and a 4 hours 370 PSI and finally at 6 hours 1220 PSI which is considered tile failure. Therefore, the bond strength at the 6 hours time period is well above the strength of the tile.

Example VII will satisfy all industry application needs.

What is claimed is:

1. A cross-linkable, adhesive tile bonding composition with a curing time of between about 1 hour to about 6 hours at room temperature and curable in the presence of water and/or moisture, said composition having two components, a resin portion (A) and filled hardener portion (B) to be mixed shortly before using, in a ratio by weight of about 0.3 to about 3 of (A) to about 1 of (B) with:

(A) a resin base portion comprising:
  (i) about 100 parts by weight of an epoxy resin material containing at least two epoxy groups and being substantially free of units derived from vegetable oils and aliphatic ethers; said epoxy resin material being derived from epichlorohydrin and polyhydric phenols, aliphatic glycidyl ethers, 2,2-bis-(4-hydroxyphenyl)-propane or bisphenol A, and having a molecular weight in the range of from about 320 to 10,000, an epoxy equivalent weight of from about 160 to 290 and a viscosity of from about 3,000 to 25,000 cps at 25° C.;
  (ii) an effective amount of alpha-hydroxy toluene as a reactive diluent; and
  (iii) an effective amount of a deaerating agent;
(B) a filled hardener portion comprising:
  (i) about 96 parts by weight of a combination of modified poyamine comprising a cycloaliphatic polyamine and the reaction product of an aliphatic polyamine and a compound selected from the group consisting of an aliphatic and aromatic mono- and diepoxides, mono- and dihydric phenols, aldehydes, nitriles, and mixtures thereof;
  (ii) an effective amount of alpha-hydroxy toluene as a reactive diluent;
  (iii) about 75 to about 100 parts by weight of a filler selected from the group comprising talc, silica, alumina, calcium carbonate, diatomaceous earth, pyrophyllite, and blanc fixe; and
  (iv) an effective amount of a deaerating agent.

2. The composition of claim 1 which further comprises a reactive and functional diluent selected from the group consisting of monoepoxides, aliphatic and aromatic polyethers and combination thereof.

3. The composition of claim 1 which further comprises the incorporation of a colorant, thixotropic agents, deaerating compounds, fillers, adhesion promoting agents, surface active agents or mixtures thereof.

4. The composition of claim 1 wherein said filler material is in a finely divided aggregate form.

5. The composition of claim 4 wherein said filler is silica having a particle size of predominately 100 mesh.

6. The composition of claim 1, wherein resin base portion (A) is mixed with filled hardener portion (B) in a ratio by weight of about 1:3.

7. The composition of claim 1 wherein resin base portion (A) comprises:
  (i) 96.0 parts by weight of an epoxy resin material with difunctional epoxy groups;
  (ii) 3.9 parts by weight of alpha-hydroxy toluene;
  (iii) 0.1 parts by weight of a deaerating compound;
  and wherein filled hardener portion (B) comprises:
  (i) 9.60 parts by weight of a combination of modified aliphatic polyamine and modified cycloaliphatic polyamine;
  (ii) 2.0 parts by weight of alpha-hydroxy toluene;
  (iii) 87.81 parts by weight of silica of about 100 mesh;
  (iv) 0.5 parts by weight of an adhesion promoter;
  (v) 0.05 parts by weight of a deaerating compound;
  and (vi) 0.04 parts by weight of carbon black.

8. The composition of claim 1, wherein resin base portion (A) further comprises up to about 190 parts by weight of a filler selected from the group comprising talc, silica, alumina, calcium carbonate, diatomaceous earth, prophyllite and blanc fixe.

9. The composition of claim 1, wherein resin portion (A) comprises about 3.9 parts to 6 parts by weight of alpha-hydroxy toluene and filled hardener portion (B) comprises about 2 parts to 6 parts by weight of alpha-hydroxy toluene.

* * * * *